(12) United States Patent
Bissonnette et al.

(10) Patent No.: US 6,912,357 B2
(45) Date of Patent: *Jun. 28, 2005

(54) FLUID HEATER

(75) Inventors: Lee A. Bissonnette, Clarkston, MI (US); Daryl G. Harris, Oxford, MI (US); Mark A. Pattison, Windsor (CA)

(73) Assignee: Valeo Electrical Systems, Inc., Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 264 days.

(21) Appl. No.: 10/059,458

(22) Filed: Jan. 29, 2002

(65) Prior Publication Data

US 2003/0141381 A1 Jul. 31, 2003

(51) Int. Cl.$^7$ ................................................. F24H 1/10
(52) U.S. Cl. ..................... 392/465; 137/341; 392/466; 392/484
(58) Field of Search ................................. 392/465, 466, 392/467, 473, 480, 486; 137/334, 341

(56) References Cited

U.S. PATENT DOCUMENTS

| | | | |
|---|---|---|---|
| 653,629 A | 7/1900 | Schneider | |
| 941,215 A | 11/1909 | Wade | |
| 1,523,156 A | 1/1925 | Adams | |
| 1,636,190 A | 7/1927 | Mattoney | |
| 2,833,909 A | 5/1958 | Levey | 219/39 |
| 3,014,251 A | 12/1961 | Sstern | 20/40.5 |
| 3,202,447 A | 8/1965 | Whaley | 294/87.2 |
| 3,292,866 A | 12/1966 | Benner | 239/284 |
| 3,332,045 A | 7/1967 | Rodaway | 335/81 |
| 3,338,476 A | 8/1967 | Marcoux | 222/146 |
| 3,427,675 A | 2/1969 | Tibbet | |
| 3,489,884 A | 1/1970 | Wasekeski | 219/522 |
| 3,553,428 A | 1/1971 | McGhee | 219/494 |
| 3,632,042 A | 1/1972 | Goulish | 239/130 |
| 3,668,757 A | 6/1972 | Rieden | 29/157.3 |
| 3,716,886 A | 2/1973 | Klomp | |

(Continued)

FOREIGN PATENT DOCUMENTS

| | | |
|---|---|---|
| CA | 1216713 | 1/1987 |
| CA | 2133592 | 4/1995 |
| CA | 2176539 | 11/1997 |
| CH | 688 432 | 9/1997 |
| DE | 854 403 | 11/1952 |
| DE | 24 54 920 | 5/1976 |
| DE | 28 04 804 | 8/1979 |
| DE | 23 53 738 | 9/1980 |
| DE | 3430 653 | 8/1984 |
| DE | 3507900 | 9/1986 |
| DE | 3 507 900 | 11/1986 |
| DE | 35 26 430 | 5/1987 |
| DE | 39 07 968 | 9/1990 |
| DE | 198 29 681 | 7/1998 |
| DE | 19820220 | 11/1999 |
| DE | 19935134 | 1/2001 |

(Continued)

OTHER PUBLICATIONS

Valeo Info. In–House Magizine #42, Dec. 2001.

Primary Examiner—Thor S. Campbell
(74) Attorney, Agent, or Firm—Young & Basile, P.C.

(57) ABSTRACT

A fluid heater apparatus supplies heat to wash fluid via a continuous, labyrinthian flow path in a thermally conductive body. A heat source is disposed in the thermally conductive body for imparting heat to the body. Fluid flowing through the thermally conductive body substantially envelopes the heat source to absorb heat from the body.

62 Claims, 11 Drawing Sheets

U.S. PATENT DOCUMENTS

| | | | |
|---|---|---|---|
| 3,756,510 A | 9/1973 | Nitterl | 239/129 |
| 3,785,359 A | 1/1974 | Whittaker | 126/19.5 |
| 3,888,412 A | 6/1975 | Lundo | 237/12.3 B |
| 3,891,827 A | 6/1975 | Wyse | 219/302 |
| 3,977,436 A | 8/1976 | Larmor | 137/625.65 |
| 3,979,068 A | 9/1976 | Applebaum | 239/284 R |
| 4,090,668 A | 5/1978 | Kochenour | 239/130 |
| 4,106,508 A | 8/1978 | Berlin | 128/346 |
| 4,159,026 A | 6/1979 | Williamson | 137/625.5 |
| 4,177,375 A | 12/1979 | Meixner | 219/441 |
| 4,212,425 A | 7/1980 | Schlick | 239/133 |
| 4,248,383 A | 2/1981 | Savage | 239/284 |
| 4,253,493 A | 3/1981 | English | 137/625.18 |
| 4,295,111 A | 10/1981 | Frosch | 335/256 |
| 4,295,769 A | 10/1981 | Douthett | 411/411 |
| 4,306,589 A | 12/1981 | Harned | 137/625.65 |
| 4,343,988 A * | 8/1982 | Roller et al. | 392/467 |
| 4,358,652 A | 11/1982 | Kaarup | 219/10.55 |
| 4,403,756 A | 9/1983 | Berlin | 244/223 |
| 4,417,116 A | 11/1983 | Black | |
| 4,430,994 A | 2/1984 | Clawson | 128/203.27 |
| 4,489,863 A | 12/1984 | Horehos | 222/504 |
| 4,508,957 A | 4/1985 | Rocchitelli | 219/305 |
| 4,524,797 A | 6/1985 | Lungu | 137/343 |
| 4,534,539 A | 8/1985 | Dettmann | 251/65 |
| 4,561,632 A | 12/1985 | Hugler | 251/129.15 |
| 4,574,841 A | 3/1986 | Hugler | 137/625.44 |
| 4,589,374 A | 5/1986 | Farina | 122/14 |
| 4,669,430 A | 6/1987 | Reinhold | 123/179 |
| 4,687,907 A * | 8/1987 | Barkley et al. | 392/473 |
| 4,689,548 A | 8/1987 | Mechlemburg | 323/243 |
| 4,690,371 A | 9/1987 | Bosley | 251/65 |
| 4,832,262 A | 5/1989 | Robertson | 239/129 |
| 4,858,576 A | 8/1989 | Jeffries | 123/145 |
| 4,877,186 A | 10/1989 | Scholl | 239/75 |
| 4,894,520 A | 1/1990 | Moran | 219/497 |
| 4,905,904 A | 3/1990 | Ohara | 239/284.1 |
| 4,927,060 A | 5/1990 | Snowball | 222/146.5 |
| 4,975,630 A | 12/1990 | Ma | 323/300 |
| 5,012,977 A | 5/1991 | Karklins | 239/284.1 |
| 5,074,471 A | 12/1991 | Baumgarten | 239/284.1 |
| 5,118,040 A | 6/1992 | Abe | 239/294.1 |
| 5,168,595 A | 12/1992 | Naylor, Jr. | 15/250.4 |
| 5,180,896 A | 1/1993 | Gibby | 219/10.55 |
| 5,183,099 A | 2/1993 | Bechu | 165/41 |
| 5,203,049 A | 4/1993 | Nogawa | |
| 5,247,148 A | 9/1993 | Mencher | 219/10.55 |
| 5,249,623 A | 10/1993 | Miller | 165/156 |
| 5,254,083 A | 10/1993 | Gentelia | 604/35 |
| 5,280,806 A | 1/1994 | Glazebrook | 137/517 |
| 5,289,698 A | 3/1994 | Garimella | 62/498 |
| 5,318,071 A | 6/1994 | Giaardo | 137/625.65 |
| 5,345,968 A | 9/1994 | Day | 137/625.46 |
| 5,351,934 A | 10/1994 | Jensen | 251/65 |
| 5,354,965 A | 10/1994 | Lee | |
| 5,369,247 A | 11/1994 | Doljack | 219/485 |
| 5,383,247 A | 1/1995 | Nickel | 15/250.04 |
| 5,421,727 A | 6/1995 | Stevens | |
| 5,428,206 A | 6/1995 | Uchida | 219/505 |
| 5,433,382 A | 7/1995 | Baumgarten | 239/284.1 |
| 5,509,606 A | 4/1996 | Breithaupt et al. | 239/130 |
| 5,598,502 A | 1/1997 | Takahashi | 392/502 |
| 5,636,407 A | 6/1997 | Len | 15/250.19 |
| 5,673,360 A | 9/1997 | Scripps | 392/405 |
| 5,676,868 A | 10/1997 | Simmons | 219/202 |
| 5,724,478 A | 3/1998 | Thweatt | |
| 5,727,769 A | 3/1998 | Suzuki | 251/129.15 |
| 5,784,751 A | 7/1998 | Tippets | 15/250.04 |
| 5,881,428 A | 3/1999 | Simmons | 15/250.04 |
| 5,927,608 A | 7/1999 | Scorirobli | 239/284.1 |
| 5,947,348 A | 9/1999 | Briski | 222/640 |
| 5,957,384 A | 9/1999 | Lansinger | 239/284.1 |
| 5,979,796 A | 11/1999 | Ponziani | 239/284.1 |
| 5,988,529 A | 11/1999 | Suhring | 239/284.1 |
| 6,009,369 A | 12/1999 | Boisvert | 701/99 |
| 6,029,908 A | 2/2000 | Petzold | 239/284 |
| 6,032,324 A | 3/2000 | Lansinger | 15/250.04 |
| 6,119,300 A | 9/2000 | Schmid | 15/250.04 |
| 6,133,546 A | 10/2000 | Bains | 219/202 |
| 6,148,258 A | 11/2000 | Boisvert | 701/99 |
| 6,164,564 A | 12/2000 | Franco et al. | |
| 6,199,587 B1 | 3/2001 | Shlomi | 137/625.5 |
| 6,236,019 B1 | 5/2001 | Piccione | 219/203 |
| 6,247,653 B1 | 6/2001 | Seyfarth | 239/284.1 |
| 6,257,500 B1 | 7/2001 | Petzold | 239/284.1 |
| 6,260,608 B1 | 7/2001 | Kim | 165/41 |
| 6,271,506 B1 | 8/2001 | Glaser | 219/505 |
| 6,330,395 B1 | 12/2001 | Wu | |
| 2002/0040895 A1 | 4/2002 | Lopez et al. | |
| 2002/0137455 A1 | 9/2002 | Ivanov et al. | |

FOREIGN PATENT DOCUMENTS

| | | |
|---|---|---|
| EP | 1 959 978 | 5/1962 |
| EP | 0 245 641 | 11/1987 |
| EP | 0 342 516 | 11/1989 |
| EP | 1 006 029 | 11/1999 |
| EP | 1 006 030 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2707230 | 7/1993 |
| FR | 2 707 230 | 7/1993 |
| GB | 370687 | 5/1931 |
| GB | 1151214 | 5/1969 |
| GB | 1 152 170 | 5/1969 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2 305 233 | 4/1997 |
| GB | 2 308 971 | 7/1997 |
| GB | 2 310 795 | 9/1997 |
| GB | 2 320 086 | 6/1998 |
| GB | 2 331 231 | 5/1999 |
| GB | 2354 688 | 11/2000 |
| GB | 2 350 555 | 12/2000 |
| GB | 2 354 688 | 3/2001 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |
| WO | WO 02/092237 | 11/2002 |

* cited by examiner

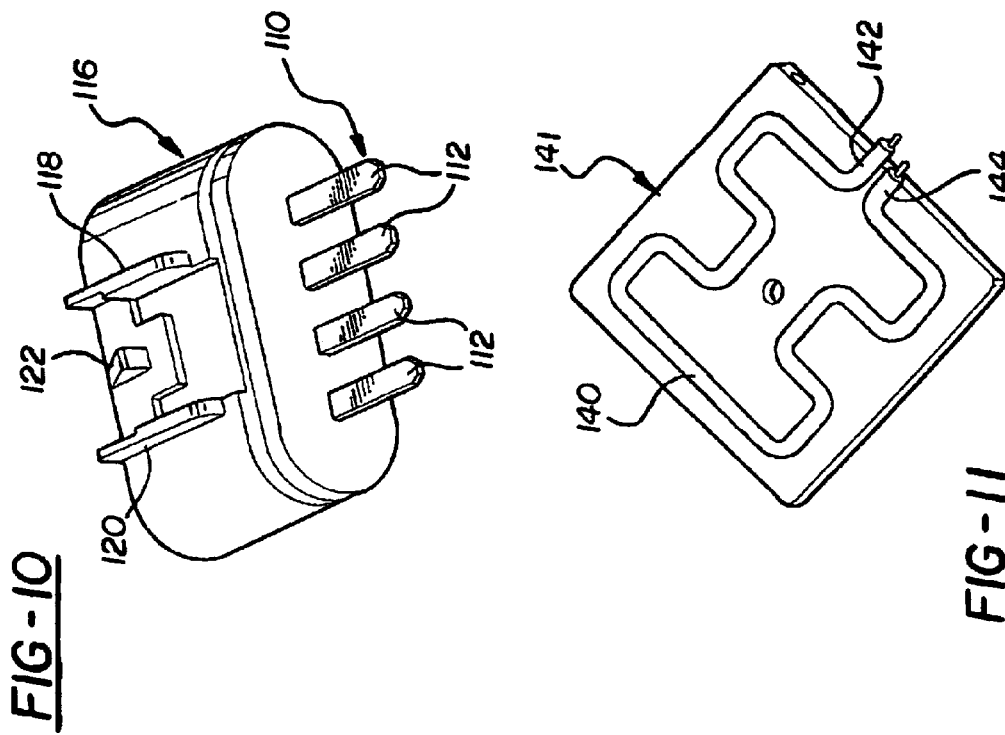
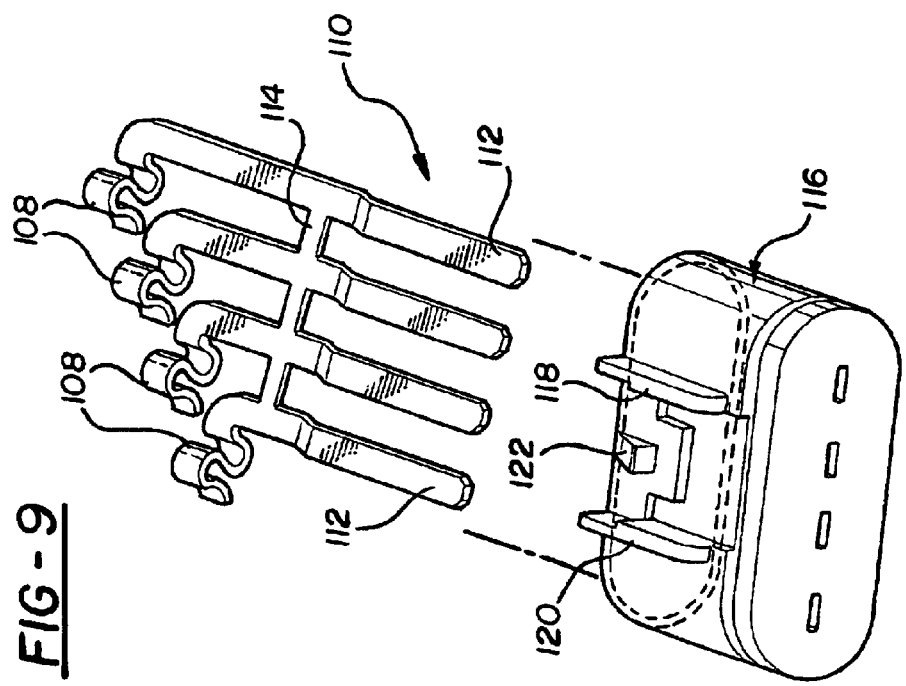

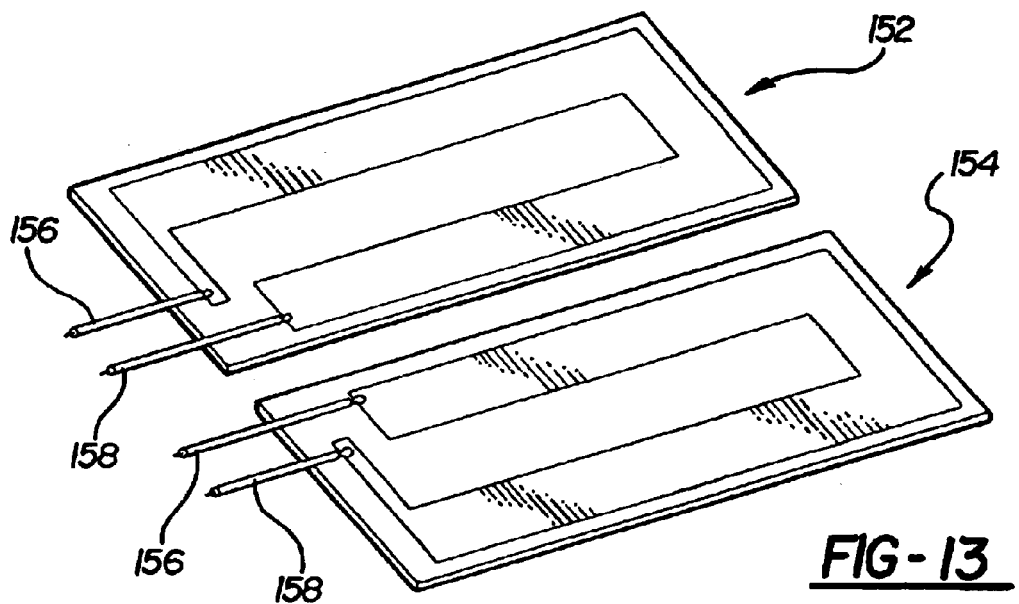
FIG-13
FIG-14
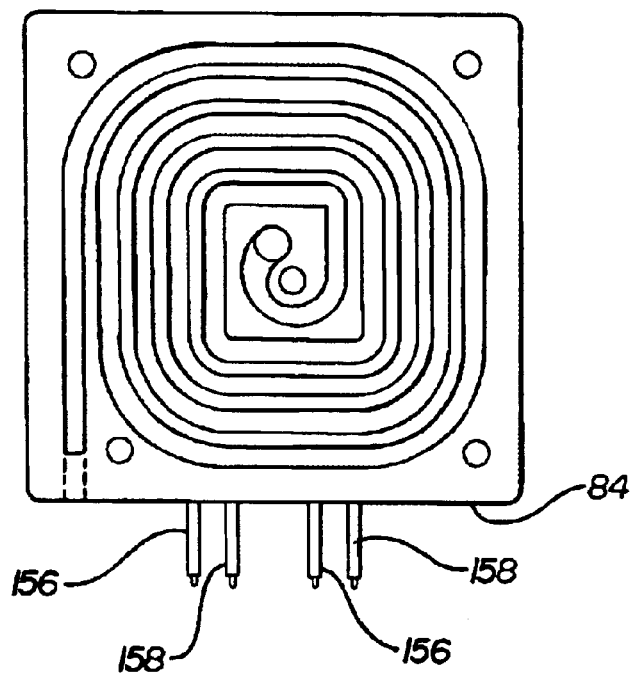

FLUID HEATER

BACKGROUND

This invention relates, in general, to fluid heater apparatus and, more particularly, to fluid heater apparatus which provide a heated wash fluid to a cleanable surface, and, still more specifically, to a heated wash fluid for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. Various wash fluid heating devices have been developed, but all typically utilize a heat exchanger design wherein a heat source is disposed in a body through which the wash fluid flows. The wash fluid picks up heat source in the heat exchange body to elevate its temperature prior to dispersion through the spray nozzle onto a vehicle window.

However, such prior wash fluid heating devices are inefficient in terms of heat transfer capability as well as being able to only provide a small quantity or a short duration of heated wash fluid onto a vehicle window. Further, direct contact of the fluid with the heat source causes hot spots in the fluid and lower temperature fluid portions which do not contact the heat source.

Thus, it would be desirable to provide a fluid heater apparatus which provides a heated fluid in an efficient manner, which has a minimal power requirements, and, which is capable of providing near instantaneous heated wash fluid and larger quantities of heated wash fluid for a longer spray application of the heated fluid onto a cleanable surface than previously devised wash fluid heater devices.

SUMMARY

The present invention is a heater apparatus for elevating the temperature of a fluid.

In one aspect, the heater apparatus includes a thermally conductive mass, heating means thermally coupled to the thermally conductive mass for imparting heat to the thermally conductive mass, and a continuous labyrinthian fluid flow path formed in the thermally conductive mass between an inlet and an outlet. The fluid flow path substantially envelopes the heating means to absorb heat from the thermally conductive mass as fluid flows through the fluid flow path between the inlet and the outlet.

In another aspect, the present invention is a wash apparatus including a fluid reservoir adapted for containing a wash fluid, a pump coupled to the fluid reservoir for pumping fluid from the reservoir, a spray nozzle fluidically coupled to the pump for discharging fluid pumped from the reservoir onto a cleanable surface, and the heater apparatus disposed in fluid flow communication between the pump, the reservoir and the nozzle.

The apparatus also includes a controller for supplying power to the heater elements of the heater apparatus.

The present heater apparatus is also usable in non-vehicle and non-cleaning fluid applications. For example, the present heater apparatus can be easily adapted for use in providing elevated, high temperature fluids for home, office and camper use as well as for industrial processes.

The fluid heater apparatus of the present invention affords a highly efficient heater apparatus which quickly and efficiently raises the temperature of a fluid. The heater apparatus is constructed to enable quick elevation of the temperature of a fluid to a desired discharge temperature and to a supply of greater quantities of heated, elevated temperature fluid at or substantially near the desired discharge temperature.

BRIEF DESCRIPTION OF THE DRAWING

The various features, advantages and other uses of the present invention will become more apparent by referring to the following detail description and drawing in which:

FIG. 9 is an exploded, perspective view of the connector housing and terminals employed in the heater module shown in the previous drawing figures;

FIG. 10 is a perspective view of the assembled connector housing and terminals shown in FIG. 9;

FIG. 11 is a perspective view of an alternate aspect of the heater module according to the present invention;

FIG. 13 is a perspective view of thick film heater elements usable in another aspect of the heater module according to the present invention;

FIG. 14 is a perspective view of the heater module according to the present invention using the thick film heater elements shown in FIG. 13;

DETAILED DESCRIPTION

Figure 1:
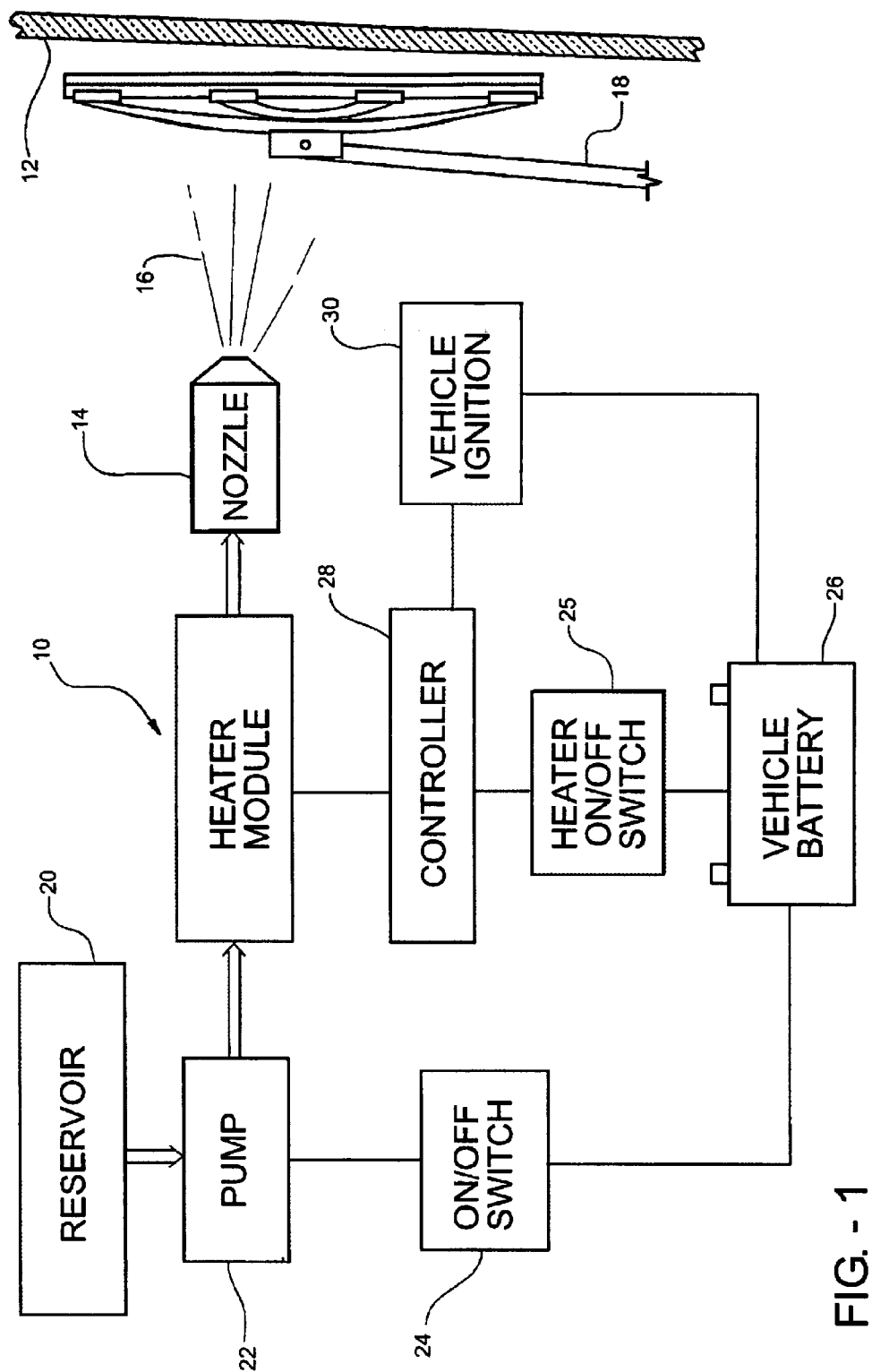
FIG. 1 is a block system diagram of a fluid heater apparatus according to the present invention used in an exemplary vehicle window wash fluid delivery system.
Figure 2:
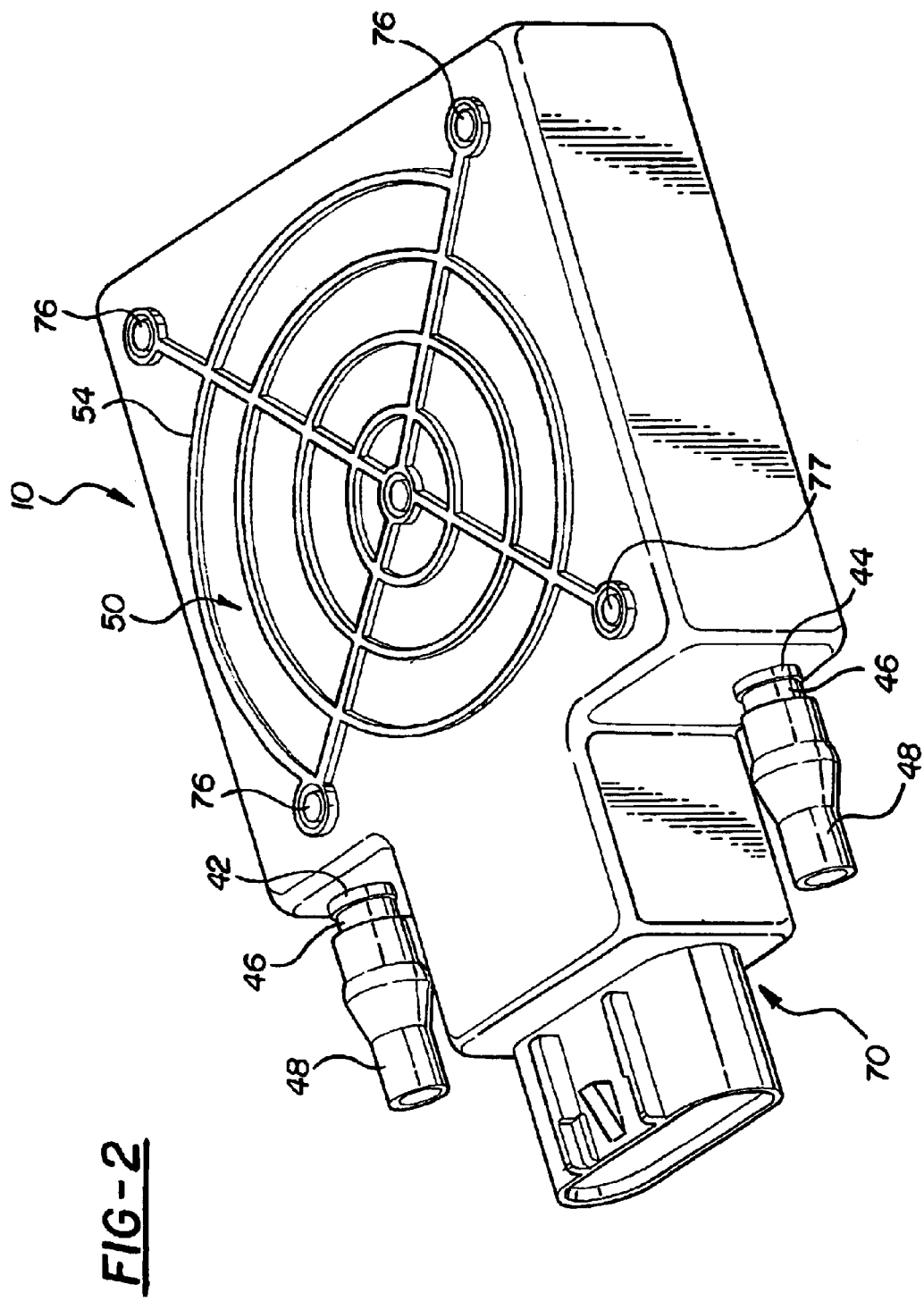
FIG. 2 is a perspective view of a heater module according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is suppled with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 160° F.–170° F., by example only, by the heater module 10. A suitable control circuit or controller 28 is provided for controlling the operation of the heater elements in the heater module 10. The controller 28 is also supplied with electric power from the vehicle battery 26. The controller 28 is activated by an "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–10, there is depicted one aspect of the heater module 10 according to the present invention.

The heater module 10 includes a heat exchange mass or body 40 formed of a suitable high thermally conductive material. Although the mass 40 is described as being formed of diecast, molded or machined aluminum, other materials, either homogenous or non-homogenous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, receive a fitting 46 and an outer sleeve 48 which are joined together for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange body 40 is disposed within an insulated housing formed by a first housing part 50 and a mating second housing part 52. The first and second housing parts 50 and 52 have complementary shapes with a major wall surface 54 and 56, respectively, and a surrounding peripheral lip 60 and 62, respectively.

A necked-down end portion 64 and 66 is formed in each first and second housing part 50 and 52, and forms an extension from one end of the respective major walls 54 and 56 as well as from the peripheral edge lips 60 and 62. The necked-down portions 64 and 66, when joined together, form an end cavity for receiving a connector assembly 70 which connects electrical conductors to the heating element (s) mounted in the joined first and second housing parts 50 and 52.

Seal members 74 and 75, formed of a resilient and thermally insulating material, are interposed between the opposed major surfaces of the heat exchange body 40 and the inner surfaces of the major walls 54 and 56 of the first and second housing parts 50 and 52, respectively. The seals 74 and 75 seal the open ends of the fluid flow channels or paths, described hereafter, in the opposed major surfaces of the heat exchange body 40.

The first and second housing parts 50 and 52 and the heat exchange body 40 are fixedly joined together, after the connector assembly 70 has been disposed in the extension 64 and 66 of the first and second housing parts 50 and 52 by suitable means, such as by heat stake rivets or projections 76 projecting outwardly from opposite major surfaces of the heat exchange body 40. The projections 76 engage apertures 77 in the major wail surfaces 54 and 56 of the first and second housing parts 50 and 52 and are heat welded together to join the first and second housing parts 50 and 52 together in a fixed connection; while maintaining the seal elements 74 and 76 in tight contact with the open ends of the fluid flow paths in the heat exchange body 40.

As shown in detail in FIGS. 4–7, the heat exchange mass or body 40 has a solid cubical shape formed of a first major surface 80, a second opposed major surface 82, and four sidewalls 84, 86, 88 and 90, interconnecting the first and second surfaces 80 and 82.

A plurality of bores 92, 94, 96 and 98 are formed in the body 40 and project inwardly from the sidewall 84. The bores 92, 94, 96 and 98 are each adapted for receiving one generally cylindrical heater element. As partially shown in FIG. 4, each bore, such as bores 96 and 98, extend through the solid central portion of the body 40 so as to be completely surrounded by the solid material of the body 40. This defines the body 40 as a heat source after receiving heat from activation of the heater elements describe hereafter.

In the aspect of the invention shown in FIGS. 4–7, the heater elements are formed of CALROD. Although different materials many be used, one example of a CALROD construction is a Nichrome wire inside of a stainless steel sheath.

Figure 4:
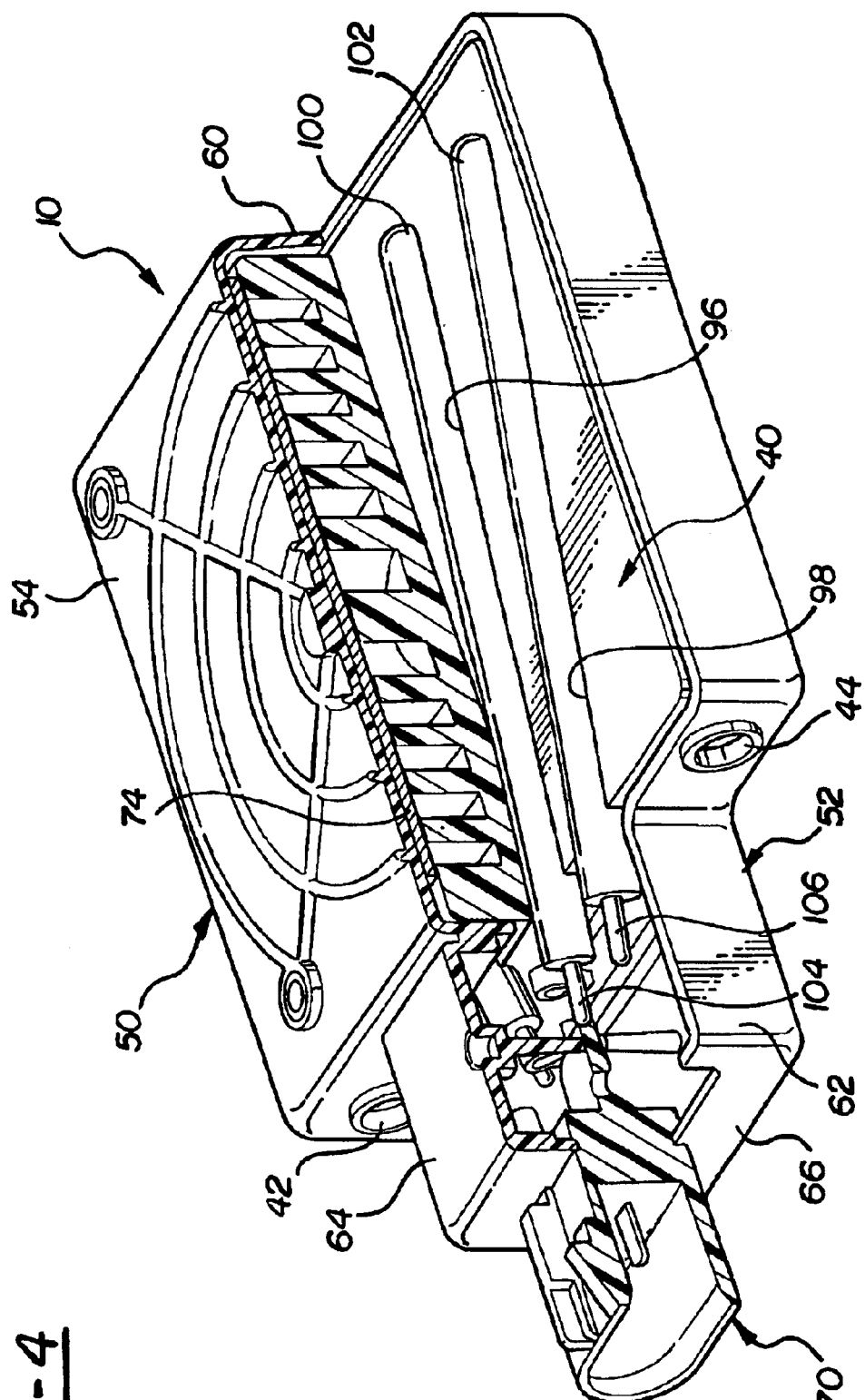
FIG. 4 is a partially broken away, perspective view of the heater module shown in FIG. 2.
Figure 5:
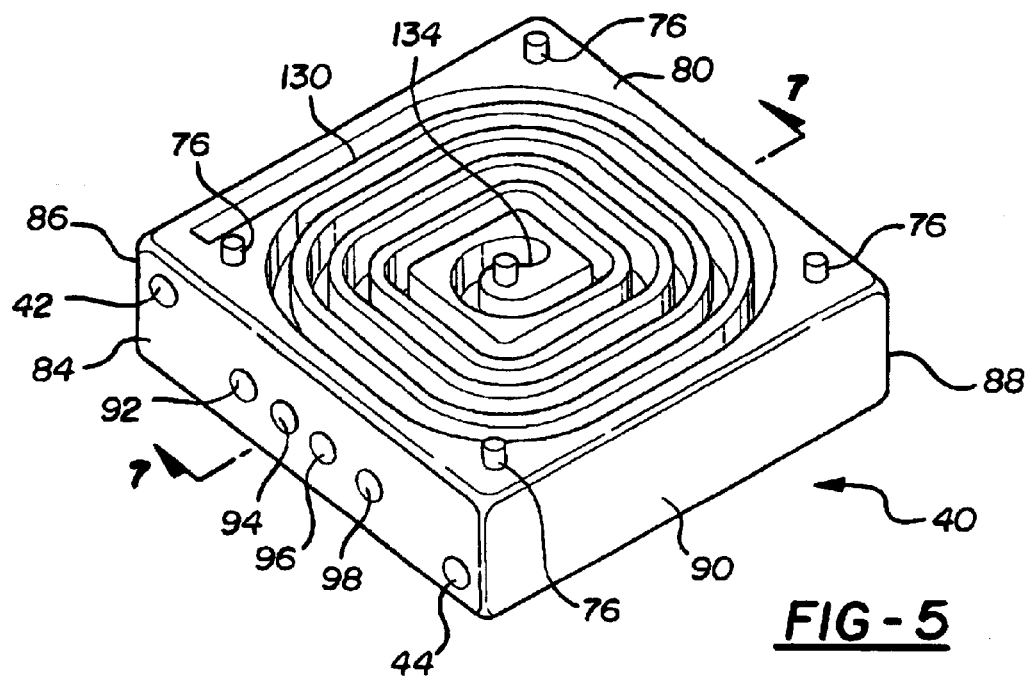
FIG. 5 is a top perspective view of the heater module thermal mass.

By way of example only, at least one and preferably a plurality, i.e., two or three or more individual heater elements 100, 102 and 103, with only heater elements 100, 102 being shown in FIG. 4, are disposed in the bores 96, 94 and 98. The function of the one or more heater elements, such as heater elements 100 and 102, will be described hereafter in conjunction with the description of the heater module 10.

Figure 7:
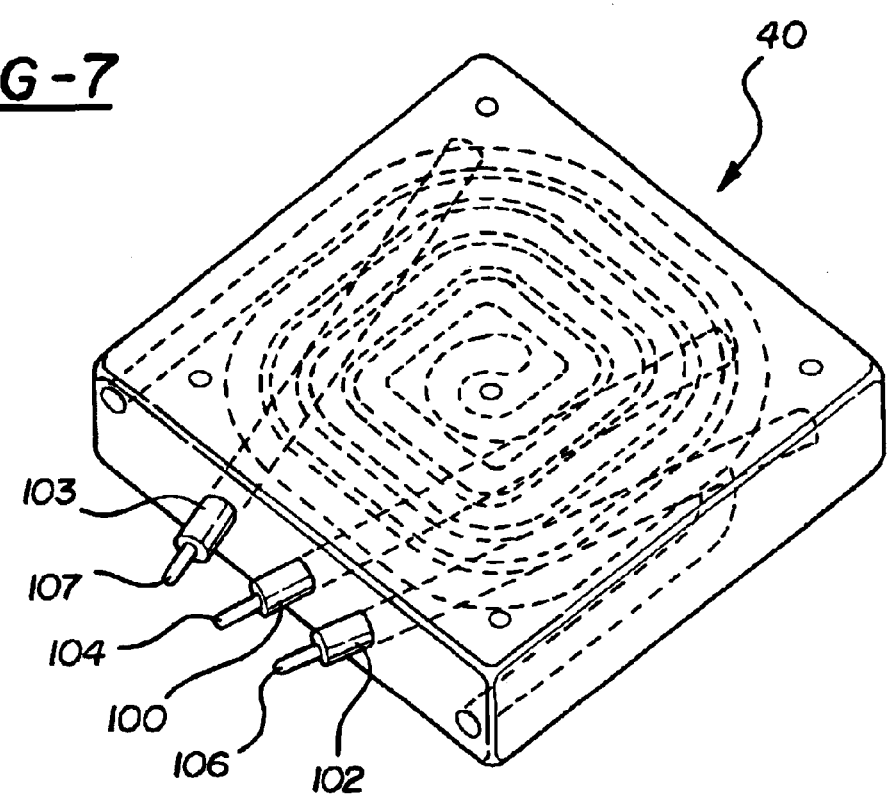
FIG. 7 is a perspective view of the interior of the heater module thermal mass shown in FIGS. 5 and 6.
Figure 8:
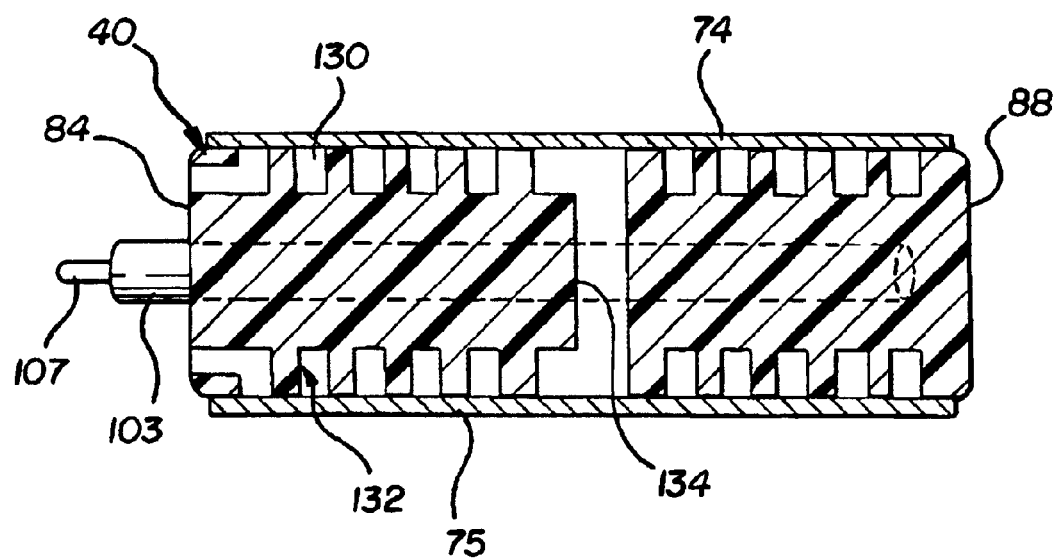
FIG. 8 is a side, cross sectional view of the heater module thermal mass shown in FIGS. 2–7.

As seen in FIGS. 4 and 7, one end 104, 106 and 107 of each heater element, elements 100, 102 and 103, respectively, projects outwardly through the sidewall 84 of the body 40. The ends 104, 106 and 107 of the heater elements 100, 102 and 103, respectively, engage individual terminals 108 formed at one end of a grid assembly 110 shown in detail in FIG. 9. The grid assembly 110 is initially formed as a single element wherein individual terminals 112 are unitarily joined together by interconnecting tabs 114. The tabs 114 are later separated from the terminals 112 to provide a separate contact for each heater element 100, 102 and 103. One terminal 112 is connected to a ground rod. The grid assembly 100 is mounted in a connector housing 116 having a generally cylindrical shape with a hollow interior. One end of the terminals 112 is connected to a circuit board 113 shown in FIG. 3. The circuit board 113 is fixedly mounted by suitable locating pins in the cavity formed by the extensions 64 and 66 of the first and second housing parts 50 and 52. One of the terminals 112 acts as a ground lead in that an end portion is disposed in contact with the outer stainless steel sheath of each heater element or CALROD 100, 102 and 103. Another of the terminals 112 is the power lead for CALROD 100. This terminal 112 provides electric power to the CALROD 100 through contact with the end 104 of heater element 100 in the grid assembly 110.

The other two terminals 112 provide power connections to the other two heater elements 102 and 103. A switch, not shown, may be interposed between the terminal 112 and the other two terminals 112 to selectively provide power to the other two terminals 112 when power is supplied to the power terminal. This switch can be a bi-metal switch, for example, which will open at a predetermined temperature, such as 50° C., as described hereafter. Alternately, a switch controlled by the circuitry on the circuit board 113 of the controller 28 will selectively connect power from the power terminal 112 to the other terminals 112. This provides the controller 28 with the capability, when receiving suitable external input signals from the vehicle body controller, for example, to deactivate the heater module 10 during the occurrence of low vehicle battery power, a thermal event, etc.

As shown in FIG. 10, another set of terminals 112, mounted in the connector housing 116, are connected internally to the circuit board 113 to provide the power, ground and external signals to the circuit board 113 as described above.

The connector housing 116 includes a pair of spaced walls 118 and 120 formed along one side edge and an intermediate latch projection 122. The walls 118 and 120 and the latch projection 122 mate with complementary recesses and a latch receiver, not shown, in a complementary connection engagable with the connector housing 116. The mating connector will include sockets which receive the terminals 115.

As shown in FIGS. 4–7, the thermally conductive mass or body 40 includes a fluid flow channel or path which extends from the inlet 42 to the outlet 44. The fluid flow path has a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternatingly create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

Figure 6:
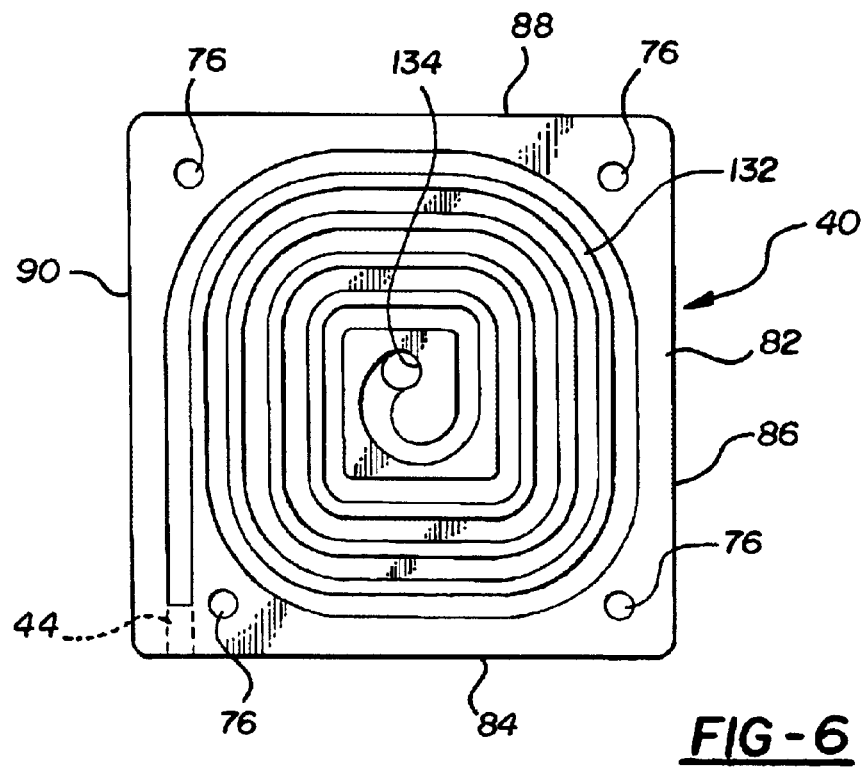
FIG. 6 is a bottom elevational view of the heater module thermal mass shown in FIG. 5.

As shown in FIG. 6, the second fluid flow channel 132 has a substantially identical spiral shape. However, fluid flow through the second fluid flow channel 132 is in an outward spiral direction from the bore 134 to the outlet 44. As described above, the seal members 74 and 75 sealingly close the open ends of the first and second fluid flow channels 130 and 132.

Thus, fluid flow through the first and second flow channels 130 and 132 starts from the inlet 42 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 160° F.–170° F. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots should occur when the fluid comes into direct contact with the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, multiple heater elements, with two or three heater elements, 100, 102 and 103, being described by way of example only, have been found to be most advantageous. The controller 28 can activate all of the plurality of heater elements 100, 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of 160° F.–170° F. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle ignition is still "on", the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Although the controller 28 can provide separate switchable signals to each of the heater elements 100, 102 and 103, in order to control each heater element 100, 102 and 103 separately under program or logic control, one simple approach includes the bi-metal element or a switch mounted between the power connections to one terminal 112 and each of the other terminals 112 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

Figure 12:
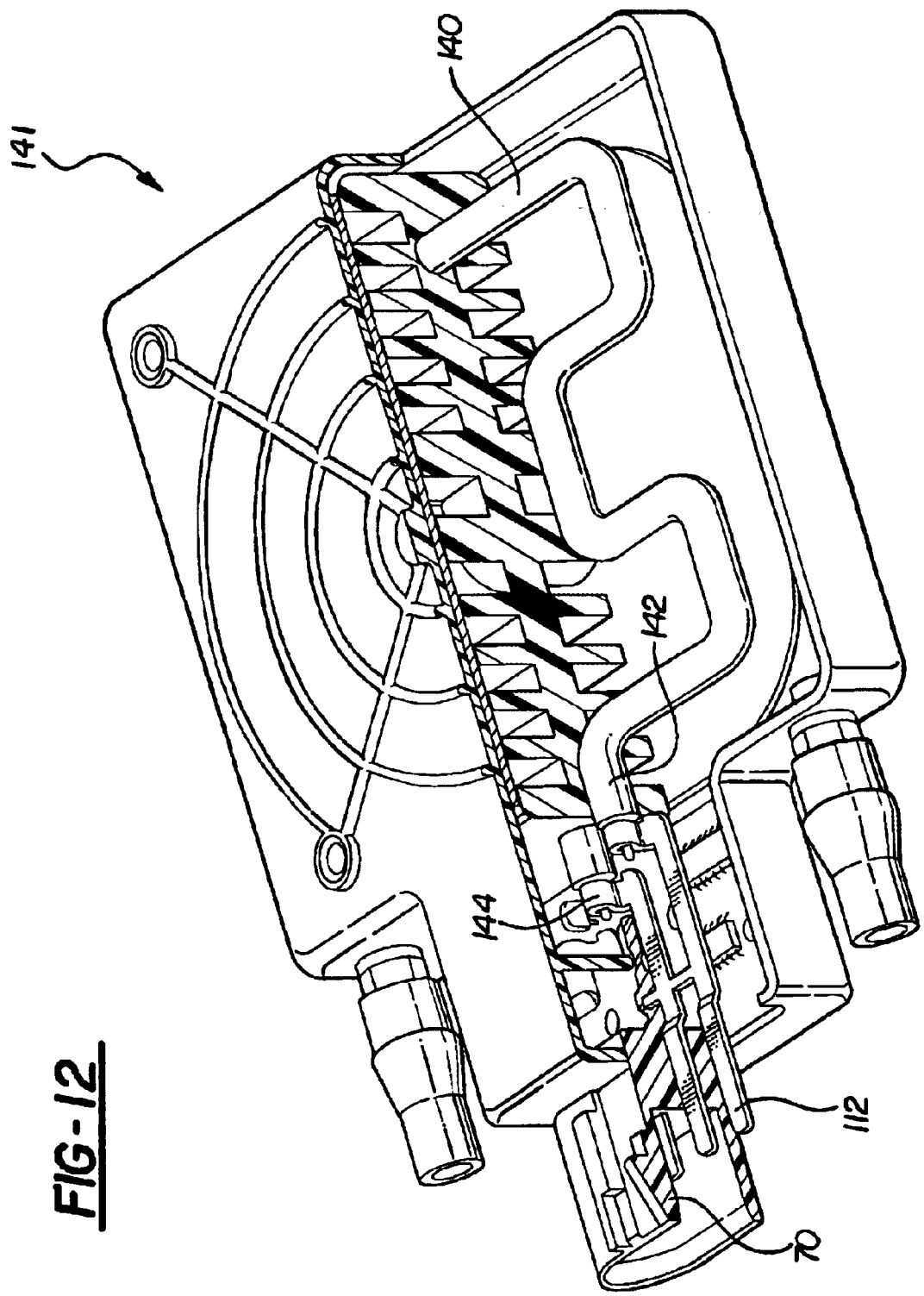
FIG. 12 is a partially broken, perspective view of the heater module shown in FIG. 11, depicting an alternate heater element.

Alternate heater element constructions are also possible in the heater module 10 of the present invention. As shown in FIG. 11 and 12, a single heater element 140 may be provided in a complementary shaped cavity in the heat exchange body 141. The single heat exchange element 140 can have a irregular shape formed of alternating, angularly disposed straight sections interconnected by arcuate corners. The single heater element 140 forms a single loop through the heat exchange body 140 from a first end 142 to a second end 144. In this aspect, the body 140 would be formed of two mating halves which are tightly joined together about the heater element 140. The same terminals 112 in the connector housing 70 may be employed to connect the single heater element 140 to the vehicle battery 26 or the controller 28.

Although slightly less electric energy efficient as the multiple CALROD beater elements 100, 102 and 103 described above and shown in FIGS. 4–7, the single irregularly shaped CALROD heater element 140 still is capable of suppling sufficient heat to the heat exchange body 141 to raise and maintain the temperature of fluid in the fluid flow channels 130 and 132 at an elevated temperature for discharge of the fluid from the body 141 at the desired discharge temperature.

Different heater elements 152 and 154 may also be employed in the body 40. As shown in FIGS. 13 and 14, the heater elements 152 and 154 comprise thick film circuit elements having circuit connections or leads 156 and 158 at opposed ends. The thick film heater elements 152 add 154 are inserted in oppositely facing directions, (the side-by-side arrangement of the heater elements 152 and 154 is depicted only for reasons of clarity) in suitably formed bores in the body 40, with the leads 156 and 158 projecting through the sidewall 84 for connection to a suitable shaped terminal assembly in the connector housing 70, not shown.

The thick film heater elements 152 and 154 are operated by the controller 28 either simultaneously for maximum power input to the heat exchange body 40, with possibly only one of the heater elements 152 and 154 being operated during periods of non-fluid discharge to maintain the temperature of the fluid in the heat exchange body 40 at an elevated temperature with minimum electrical power drain on the vehicle battery 26.

Figure 15:
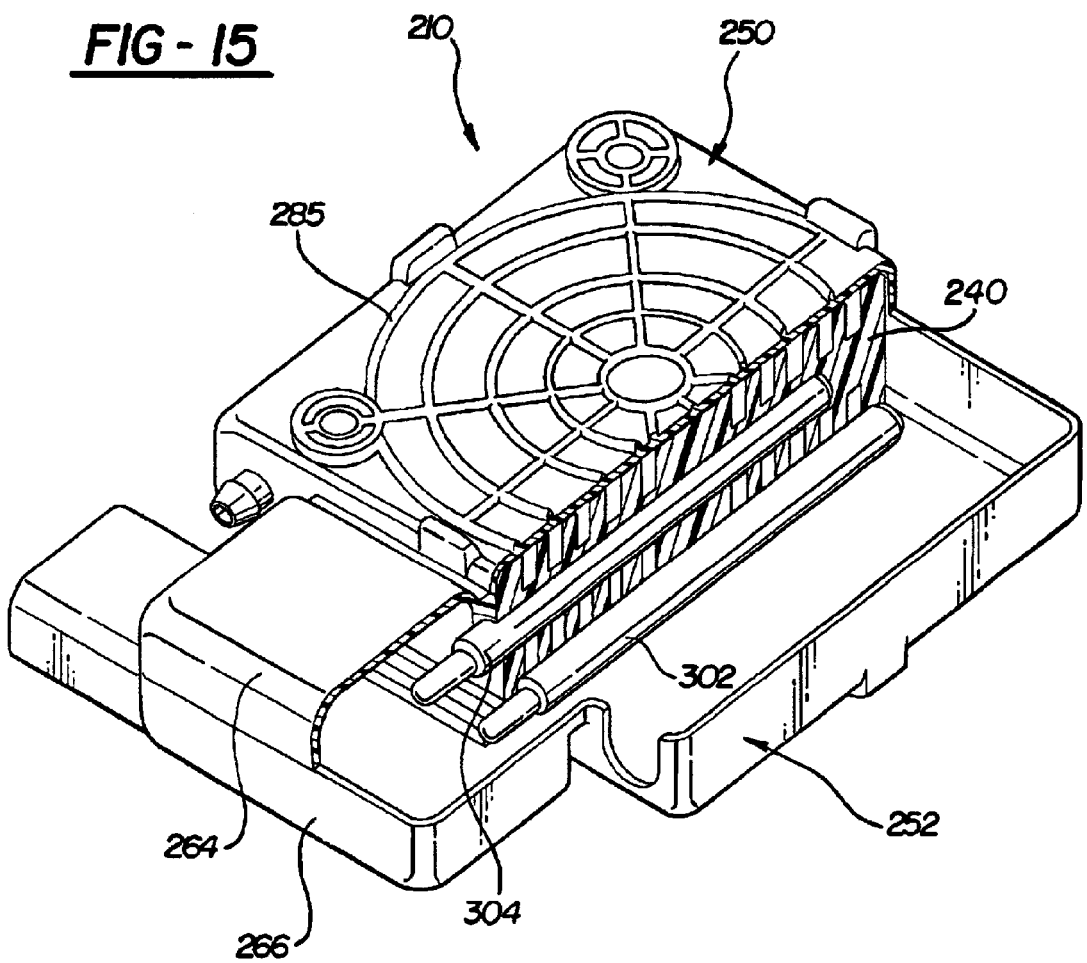
FIG. 15 is a partially broken away, perspective view of another aspect of a heater module according to the present invention.
Figure 16:
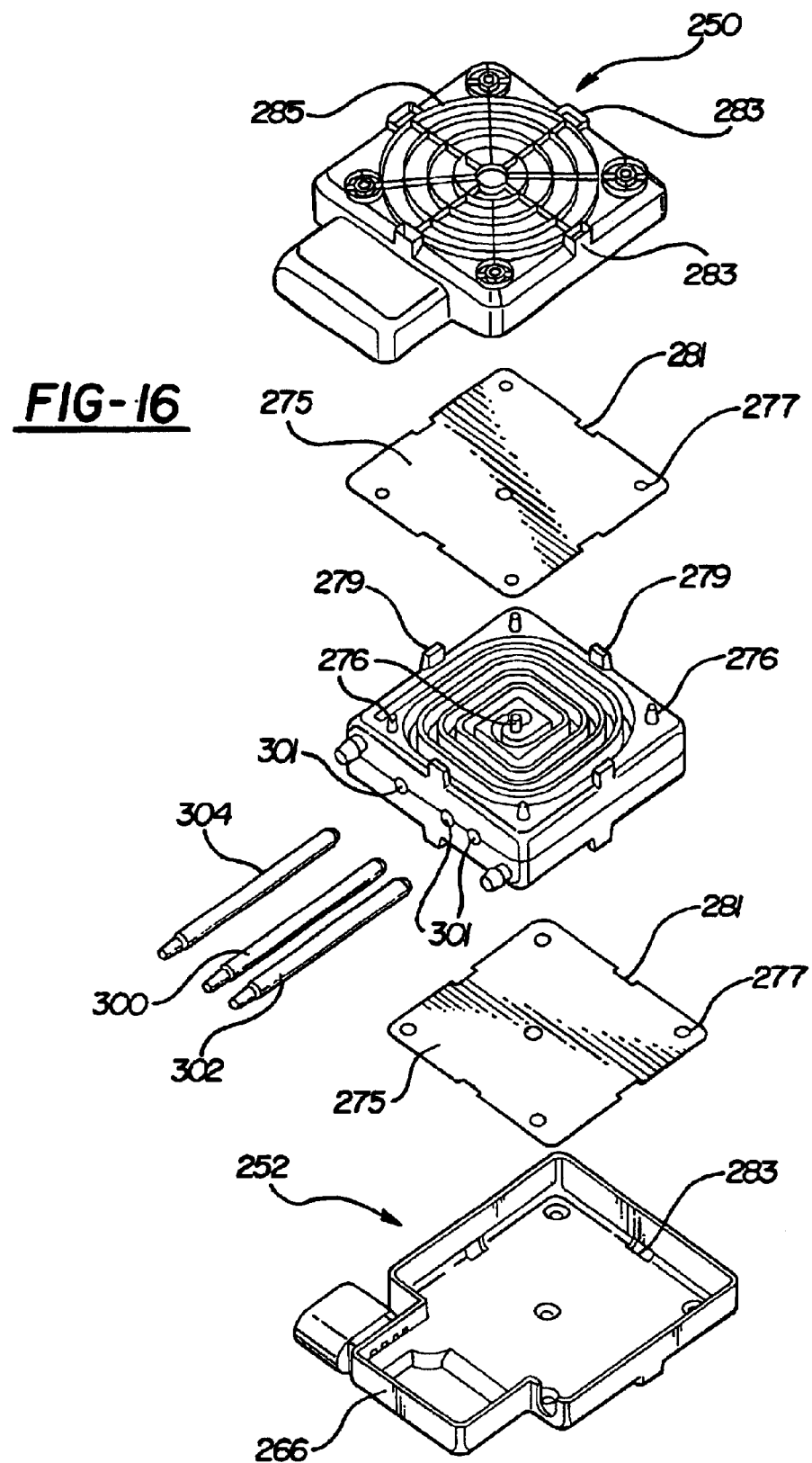
FIG. 16 is an exploded, perspective view of the heater module shown in FIG. 15.

Referring now to FIGS. 15 and 16, there is depicted another aspect of a heater module 210. The heater module 210 is substantially the same as the heater module 10 described above and shown in FIGS. 1–10. However, for clarity, like elements in the two different aspects of the heater modules 10 and 210 are distinguished in the heater module 210 by a "200" reference number prefix, but the same tens and units. Only the major differences between the heater module 210 and the heater module 10 will be discussed will be discussed in detail.

The heater module 210 as shown in FIGS. 15 and 16 includes first and second housing parts 250 and 252. Extensions 264 and 266 are disposed with an elongated or longer dimension extending perpendicular to the direction of the heater elements inserted into a thermal mass 240.

Projections or stakes 276 on opposite major surfaces of the mass 240 extend through apertures 277 in seals or gaskets 275 and corresponding apertures in the housing parts 250 and 260. Outer ends of the stakes 276 are riveted or heat welded to securely join the housing parts 250 and 252 about the thermal mass 240. For added strength, ribs 279 extend from each side edge of the thermal mass 240. The ribs 279 extend through notches 281 in the gaskets 275 and through slotted bosses 283 in each housing part 250 and 252. The outer ends of the ribs 279, after passing through the bosses 283, are bent over or otherwise securely mechanically joined to the outer surface of the housing parts 250 and 252.

Figure 3:
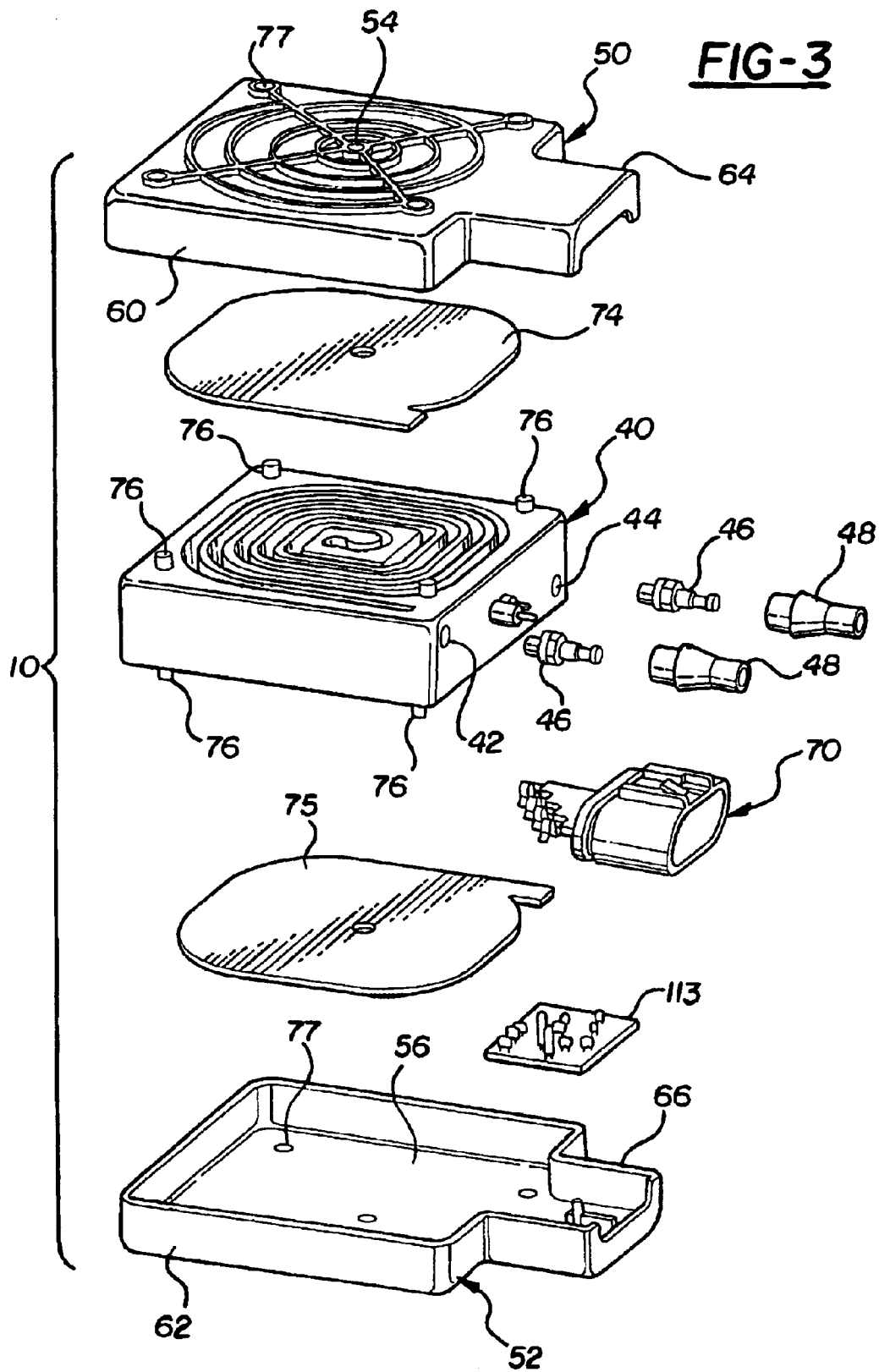
FIG. 3 is an exploded perspective view of the heater module shown in FIG. 2.

As shown in FIGS. 15 and 16 as well as in FIG. 3 for the heater module 10, a plurality of ribs 285 are formed on the outer surface of each housing part 250 and 252. The ribs 285, which are depicted only in an exemplary configuration, provide structural strength to the housing parts 250 and 252 which are typically formed of plastic.

In this aspect of the heater module 210, heater elements or CALRODS 300, 302 and 304 are mounted in bores 301 formed in the mass 240. The bores 301 extend generally parallel to two opposed side surfaces of the mass 240.

Other than the above described differences, the heater module 210 functions in the same manner as the heater module 10 described above.

In summary, there has been disclosed a unique fluid heater apparatus which efficiently heats fluid to a desired discharge temperature with minimum power requirements and a quick temperature rise time.

What is claimed is:

1. A heater apparatus for heating fluid, the heater apparatus comprising:

a thermally conductive mass defining a thermal energy store;

heating means, thermally coupled to and substantially enveloped by the thermally conductive mass, for imparting heat to the thermally conductive mass;

fins thermally coupled to the thermally conductive mass and coacting with each other and the mass to define a continuous labyrinthian fluid flow path so that heat from the heating means migrates to and is in stored the thermally conductive mass and migrates from the thermally conductive mass to the fluid whereon heat is absorbed by fluid in the fluid flow path; and the fluid flow path including a first flow path portion extending across one surface of the thermally conductive mass, and a second flow path portion extending across an opposed surface of the thermally conductive mass, the first and second flow path portions disposed in fluid flow communication, and defining alternating regions of laminar and turbulent fluid flow as the fluid flows through the first and second flow path portions.

2. The heater apparatus of claim 1 wherein the fluid flow path defines a spirally shaped fluid flow path.

3. The heater apparatus of claim 1 wherein the first and second flow path portions are disposed in fluid flow communication substantially at the center of the thermally conductive mass.

4. The heater apparatus of claim 1 wherein:

the first flow path defines a spiral flow path extending radially inward from an inlet to a bore connecting the first flow path to the second flow path; and the second flow path defines a spirally shaped fluid flow path extending radially outward from the bore connecting the first flow path to the second flow path to the outlet.

5. The heater apparatus of claim 1 wherein the heating means comprises:

at least one heater element mounted in the mass.

6. The heater apparatus of claim 5 wherein the heating means comprises:

a plurality of heater elements mounted in the mass.

7. The heater apparatus of claim 6 further comprising:

a controller for controlling the individual activation of each of the heater elements.

8. The heater apparatus of claim 1 wherein the heating means comprises:

a CALROD.

9. The heater apparatus of claim 1 wherein the heating means comprises:

a thick film heater element.

10. The heater apparatus claim 1 further comprising:

a controller for controlling the activation of the heating means.

11. The heater apparatus of claim 1 wherein:

the fluid flow path defines a spirally shaped fluid flow path formed of alternating substantially liner and arcuate portions to create alternating lamina and turbulent fluid flow through the fluid flow path to maximize heat absorption by the fluid from the fins; and concentric flow portions of the fluid flow path are disposed adjacent to each other and separated by one fin.

12. A heater apparatus for heating fluid, the heater apparatus comprising:

a thermally conductive mass defining a thermal energy store;

fins thermally coupled to the mass and coacting with each other and the mass to form a continuous labyrinthian fluid flow path including a first flow path portion extending across one surface of the thermally conductive mass and a second flow path portion extending across an opposed surface of the thermally conductive mass, the first and second flow path portions disposed in fluid flow communication through the thermally conductive mass and defining alternating regions of laminar and turbulent fluid flow as the fluid flows through the first and second flow path portions; and at least one heating element thermally mounted in the thermally conductive mass and substantially enveloped by the mass, the heating element imparting heat to the thermally conductive mass so that fluid in the first and second flow path portions absorbs heat from the fins, the heat migrating to the fins from the thermally conductive mass.

13. The heater apparatus of claim 12 wherein:

the first flow path defines a spiral shaped flow path extending radially inward from an inlet to a bore connecting the first flow path to the second flow path; and the second flow path defines a spirally shaped fluid flow path extending radially outward from the bore connecting the first flow path to the second flow path to the outlet.

14. The heater apparatus of claim 12 wherein the heating means comprises:

a plurality of heater elements mounted in the mass.

15. The heater apparatus of claim 12 further comprising:

a controller for controlling the individual activation of each of the heater elements.

16. The heater apparatus of claim 12 wherein the heating means comprises:

a CALROD.

17. The heater apparatus of claim 12 wherein the heating means comprises:

a thick film heater element.

18. A vehicle window wash apparatus comprising:

a fluid source for supplying wash fluid;

a fluid discharge device fluidically coupled to the fluid source for discharging fluid from the fluid source;

heater means disposed in fluid flow communication between the fluid source and the fluid discharge device; and a controller, coupled to the heater means, for supplying power to the heater means;

the heater apparatus including:

a thermally conductive mass having an inlet and an outlet and defining the thermal energy store;

fins thermally coupled to the thermally conductive mass and coacting with each other and the mass to define a continuous labyrinthian fluid flow path between the inlet and the outlet, the fluid flow path substantially enveloping the heating means so that heat from the heating means migrates to and is stored in the thermally conductive mass and migrates from the thermally conductive mass to the fluid whereon heat is absorbed by fluid in the fluid flow path; and the fluid flow path including a first flow path portion extending across one surface of the thermally conductive mass, and a second flow path portion extending across an opposed surface of the thermally conductive mass, the first and second flow path portions disposed in fluid flow communication, and defining alternating regions of laminar and turbulent fluid flow as the fluid flows through the first and second flow path portions.

19. The wash apparatus of claim 18 wherein the fluid flow path defines a spirally shaped fluid flow path.

20. The wash apparatus of claim 18 wherein the fluid flow path comprises:
 a first flow path portion extending across one surface of the thermally conductive mass; and
 a second flow path portion extending across an opposed surface of the thermally conductive mass, the first and second flow path portions disposed in fluid flow communication.

21. The wash apparatus of claim 20 wherein the first and second flow path portions are disposed in fluid flow communication substantially at the center of the thermally conductive mass.

22. The wash apparatus of claim 20 wherein:
 the first flow path defines a spiral shaped flow path extending radially inward from an inlet to a bore connecting the first flow path to the second flow path; and
 the second flow path defines a spirally shaped flow path extending radially outward from the bore connecting the first flaw path to the second flow path to the outlet.

23. The wash apparatus of claim 18 wherein the heating means comprises:
 at least one heater element mounted in the mass.

24. The wash apparatus of claim 23 wherein the heating means comprises:
 a plurality of heater elements mounted in the mass.

25. The wash apparatus of claim 24 further comprising:
 a controller for controlling the individual activation of each of the heater elements.

26. The wash apparatus of claim 18 wherein the heating means comprises:
 a CALROD.

27. The wash apparatus of claim 18 wherein the heating means comprises:
 a thick film heater element.

28. The wash apparatus claim 18 further comprising:
 a controller for controlling the activation of the heating means.

29. The wash apparatus of claim 18 wherein:
 the fluid flow path defines a spirally shaped fluid flow path wherein adjacent flow portions of the fluid flow path are disposed adjacent to each other and separated by a wall of the thermally conductive mass.

30. The wash apparatus of claim 18 further comprising:
 the fluid flow path formed such that fluid flow through the fluid flow path in radially adjacent flow path portions is in the same direction.

31. A method of heating fluid comprising the steps of:
 applying thermal energy to a thermally conductive mass by a heating means thermally coupled within the mass for storing thermal energy in the mass; and
 thermally coupling fins to the mass, the fins forming a continuous labyrinthian fluid flow path between an inlet and an outlet, thermally conductive mass substantially enveloping the heating means so that fluid within the fluid flow path absorbs heat from the mass so that heat migrates from the heating means to the mass and from the mass to the fins; and forming the fluid flow path to include a first flow path portion extending across one surface of the thermally conductive mass, and a second flow path portion extending across an opposed surface of the thermally conductive mass, the first and second flow path portions disposed in fluid flow communication, and defining alternating regions of laminar and turbulent fluid flow as the fluid flows through the first and second flow path portions.

32. The method of claim 31 wherein the step of forming the fluid flow path further comprises the step of:
 forming the fluid flow path as a spirally shaped fluid flow path.

33. The method of claim 31 wherein the step of forming the fluid flow path further comprises the steps of:
 forming the fluid flow path with a first flow path portion extending through the mass, and a second flow path portion extending through the mass, the first and second fluid flow paths disposed in fluid flow communication.

34. The method of claim 33 wherein the step of forming the fluid flow path further comprises the steps of:
 forming the first flow path as a spiral flow path extending radially inward from an inlet to a bore connecting the first flow path to the second flow path; and
 forming the second flow path as a spirally shaped fluid flow path extending radially outward from the bore connecting the first flow path to the second flow path to the outlet.

35. The method of claim 31 further comprising the step of:
 forming the heating means of at least one heater element mounted in the mass.

36. The method of claim 31 further comprising the step of:
 forming the heating means as a plurality of heater elements mounted in the mass.

37. The method of claim 31 wherein the step of forming the fluid flow path further comprises the step of:
 forming the fluid flow path as a spirally shaped fluid flow path having concentric flow portions, the concentric flow portions of the fluid flow path disposed adjacent to each other and separated by a wall of the thermally conductive mass.

38. A heating apparatus for heating fluid, the heating apparatus comprising:
 means for providing a thermally conductive mass defining a thermal energy store;
 means for thermally coupling heating means to the thermally conductive mass for imparting thermal energy to the thermally conductive mass;
 means for forming fins thermally coupled to the thermally conductive mass and coacting with each other and the mass to define a continuous labyrinthian fluid flow path in the mass between an inlet and an outlet, the fluid flow so that heat migrates from the heating means to the mass and from the mass to the fins so that fluid flowing through the fluid flow path absorbs heat from the mass; and
 means for forming the first flow path to include a first flow path portion extending across an opposed surface of the thermally conductive mass, the first and second flow path portion disposed in fluid flow communication, and defining alternating regions of laminar and turbulent fluid flow as the fluid flows through the first and second flow path portions.

39. A method of heating fluid comprising the steps of:

storing thermal energy in a thermally conductive mass by a heating means;

thermally coupling fins to the mass to form a fluid flow path thermally coupled within the mass and radiating heat from the mass;

thermal energy migrating to the fins from the mass to a fluid in the fluid flow path;

forming the fluid flow path to include a first flow path portion extending across one surface of the thermally conductive mass, and a second flow path portion extending across an opposed surface of the thermally conductive mass, the first and second flow path portions disposed in fluid flow communication; and forming means coupled to the fluid flow path, for discharging at least a portion of the fluid in the fluid flow path in one discharge cycle, the thermally conductive mass storing substantive quantities of thermal energy from the heating means during the one discharge cycle so that thermal energy flows only from the thermally conductive mass in the direction of the fluid in the fluid flow path which enters the fluid flow path after the one discharge cycle.

40. The method of claim 39 further comprising the step of:
disposing the heating means in the mass.

41. The method of claim 39 further comprising the step of:
forming the heater means as a heater element.

42. The method of claim 39 further comprising the step of:
forming the fluid flow path to induce turbulent flow in the fluid circulating through the fluid flow path.

43. The method of claim 39 further comprising the step of:
forming the fluid flow path in a spiral configuration.

44. The method of claim 39 further comprising the step of:
forming the fluid flow path with arcuate and non-arcuate portions.

45. A heating apparatus for heating fluid comprising:

means for storing thermal energy to a thermally conductive mass by a heating means;

means for forming a fluid flow path thermally coupled to the mass;

means for imparting thermal energy to the fluid in the fluid flow path from the mass and the fins;

means for forming a fluid flow path thermally coupled to the mass, the fluid flow path including a first flow path portion extending across one surface of the thermally conductive mass, and a second flow path extending across an opposed surface of the thermally conductive mass, the first and second flow path portions disposed in fluid flow communication; and means, coupled to the fluid flow path, for discharging at least a portion of the fluid in the fluid flow path in one discharge cycle, the thermally conductive mass storing substantive quantities of thermal energy from the heating means during the one discharge cycle so that thermal energy flows only from the thermally conductive mass in the direction of the fluid in the fluid flow path which enters the fluid flow path after the one discharge cycle.

46. A heating apparatus for heating fluid comprising:

a thermally conductive mass defining a thermal energy store;

a fluid flow path thermally coupled to the mass;

the fluid flow path including a first flow path portion extending across one surface of the thermally conductive mass, and a second flow path portion extending across an opposed surface of the thermally conductive mass, the first and second flow path portions disposed in fluid flow communication;

heating means thermally coupled to the mass for storing heat in the mass, the heat migrating from the mass to fluid within the fluid flow path; and means coupled to the fluid flow path, for discharging at least a portion of the fluid in the fluid flow path in one discharge cycle, the thermally conductive mass storing substantive quantities of thermal energy from the heating means during the one discharge cycle so that thermal energy flows only from the thermally conductive mass in the direction of the fluid in the fluid flow path which enters the fluid flow path after the one discharge cycle.

47. The heating apparatus of claim 46 wherein:
the mass is a body.

48. The heating apparatus of claim 46 further comprising:
an inlet and an outlet formed in the body in fluid flow communication with the fluid flow path.

49. The heating apparatus of claim 46 further comprising:
the fluid flow path defining a serpentine path between the inlet and the outlet.

50. The heating apparatus of claim 46 wherein:
the fluid flow path has a spiral shape.

51. The heating apparatus of claim 46 wherein the fluid flow path comprises:
arcuate and non-arcuate portions in the fluid flow path to induce turbulence fluid flow.

52. The heating apparatus of claim 46 wherein:
the heater means is disposed in the mass.

53. The heating apparatus of claim 46 wherein the heater means comprises:
at least one heater element.

54. The heating apparatus of claim 46 wherein the heater means comprises:
a plurality of discrete heat elements coupled to the mass.

55. The heating apparatus of claim 46 further comprising:
means for dispensing fluid at an elevated temperature from the mass onto a surface.

56. The heating apparatus of claim 55 wherein:
the surface is a vehicle surface.

57. The heating apparatus of claim 56 wherein the means for discharging comprises:
a fluid discharge device; and
the apparatus further including a fluid source containing the fluid.

58. A vehicle wash fluid discharge apparatus comprising:
a fluid source for a fluid;
a fluid discharge device fluidically coupled to the discharge source for discharging fluid from the fluid source;
a thermally conductive mass defining a thermal energy store;
heating means, thermally coupled to the thermally conductive mass, for imparting heat to the thermally conductive mass;
fins thermally coupled to the thermally conductive mass and coacting with each other and the mass to define a continuous labyrinthian fluid flow path so that heat from the heating means migrates to and is stored in the thermally conductive mass and migrates from the thermally conductive mass to the fluid whereon heat is absorbed by fluid in the fluid flow path; and the fluid flow path including a first flow path portion extending across one surface of the thermally conductive mass, and a second flow path portion extending across an opposed surface of the thermally conductive mass, the first and second flow path portions disposed in fluid flow communication, and defining alternating regions of laminar and turbulent fluid flow as the fluid flows through the first and second flow path portions.

59. The apparatus of claim 58 further comprising:

a controller, coupled to the heating means, for supplying electric power to the heating means.

60. The heater apparatus of claim 1 wherein:

the fluid flow path defines a fluid flow path formed of alternating substantially linear and arcuate portions to create alternating laminar and turbulent fluid flow through the fluid flow path to maximize heat absorption by the fluid from the fins; and concentric flow portions of the fluid flow path are disposed adjacent to each other and separated by one fin.

61. The heater apparatus of claim 1 further comprising:

a cover member, formed of a thermal insulating material, coupled to the fins for sealingly closing the open end of the fluid flow passage through the fins.

62. The heater apparatus of claim 1 wherein the heating means comprises:

at least one tubular heater disposed in the thermally conductive mass.

* * * * *